United States Patent
Cheng et al.

(10) Patent No.: US 9,902,291 B2
(45) Date of Patent: Feb. 27, 2018

(54) VEHICLE AND SLIDING FEEDBACK CONTROL SYSTEM OF VEHICLE AND METHOD FOR THE SAME

(71) Applicant: BYD COMPANY LIMITED, Shenzhen (CN)

(72) Inventors: Hua Cheng, Shenzhen (CN); Hao Chen, Shenzhen (CN); Ou Ruan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/917,884

(22) PCT Filed: Sep. 5, 2014

(86) PCT No.: PCT/CN2014/086018
§ 371 (c)(1),
(2) Date: Mar. 9, 2016

(87) PCT Pub. No.: WO2015/032344
PCT Pub. Date: Mar. 12, 2015

(65) Prior Publication Data
US 2016/0221469 A1    Aug. 4, 2016

(30) Foreign Application Priority Data
Sep. 9, 2013    (CN) .......................... 2013 1 0405003

(51) Int. Cl.
*B60L 9/00*    (2006.01)
*B60L 11/00*    (2006.01)
(Continued)

(52) U.S. Cl.
CPC .......... *B60L 15/2045* (2013.01); *B60K 6/442* (2013.01); *B60K 6/48* (2013.01);
(Continued)

(58) Field of Classification Search
CPC .......... B60Y 2400/442; B60Y 2300/91; B60Y 2200/126; B60L 11/1809; B60L 11/1848;
(Continued)

(56) References Cited

U.S. PATENT DOCUMENTS 5,927,415 A    7/1999    Ibaraki et al.
6,059,059 A    5/2000    Schmidt-Brücken
(Continued)

FOREIGN PATENT DOCUMENTS

CN    1447757    10/2003
CN    1528612 A    9/2004
(Continued)

OTHER PUBLICATIONS

"Cruise Control—Wikipedia, the free encyclopedia." [retrieved May 8, 2017]. Retrieved via the Internet Archive Wayback Machine at <URL:https://en.wikipedia.org/wiki/Cruise_control.
(Continued)

*Primary Examiner* — Jelani Smith
*Assistant Examiner* — Luis A Martinez Borrero
(74) *Attorney, Agent, or Firm* — Alston & Bird LLP

(57) ABSTRACT

A sliding feedback control system of a vehicle is provided. The system includes: an electric motor; a power battery; a battery manager connected with the power battery, and configured to obtain a maximum charging power of the power battery; and a motor controller connected with the electric motor, and configured to obtain maximum feedback torque values of the motor controller and the electric motor, to convert the maximum charging power of the power battery into a maximum feedback torque value of the power battery, to determine a minimum of the maximum feedback torque values as a first feedback torque value, to obtain a second feedback torque value, and to determine a final feedback torque value of the electric motor as a minimum of
(Continued)

the first and second feedback torque values, such that the electric motor controls the vehicle to perform the sliding feedback operation according to the final feedback torque value.

20 Claims, 7 Drawing Sheets

(51) Int. Cl.
| | |
|---|---|
| *B60L 15/20* | (2006.01) |
| *B60K 6/48* | (2007.10) |
| *B60W 20/13* | (2016.01) |
| *B60K 6/442* | (2007.10) |
| *B60L 11/18* | (2006.01) |
| *B60W 10/06* | (2006.01) |
| *B60W 10/08* | (2006.01) |
| *B60W 30/18* | (2012.01) |
| *B60L 7/18* | (2006.01) |
| *B60L 3/10* | (2006.01) |

(52) U.S. Cl.
CPC .............. *B60L 3/108* (2013.01); *B60L 7/18* (2013.01); *B60L 11/1861* (2013.01); *B60W 10/06* (2013.01); *B60W 10/08* (2013.01); *B60W 20/13* (2016.01); *B60W 30/18127* (2013.01); *B60K 2006/4825* (2013.01); *B60L 2240/423* (2013.01); *B60L 2240/425* (2013.01); *B60L 2250/28* (2013.01); *B60W 2510/087* (2013.01); *B60W 2510/1005* (2013.01); *B60W 2510/18* (2013.01); *B60W 2510/244* (2013.01); *B60W 2510/246* (2013.01); *B60W 2520/10* (2013.01); *B60W 2540/10* (2013.01); *B60W 2550/142* (2013.01); *B60W 2710/083* (2013.01); *B60Y 2200/92* (2013.01); *B60Y 2300/143* (2013.01); *B60Y 2300/18175* (2013.01); *B60Y 2300/43* (2013.01); *B60Y 2300/60* (2013.01); *B60Y 2400/301* (2013.01); *B60Y 2400/302* (2013.01); *B60Y 2400/303* (2013.01); *B60Y 2400/81* (2013.01); *Y02T 10/6221* (2013.01); *Y02T 10/6252* (2013.01); *Y02T 10/645* (2013.01); *Y02T 10/7005* (2013.01); *Y02T 10/705* (2013.01); *Y02T 10/7044* (2013.01); *Y02T 10/72* (2013.01); *Y02T 10/7283* (2013.01); *Y10S 903/93* (2013.01)

(58) Field of Classification Search
CPC .... B60L 11/1875; B60L 2220/44; B60L 3/12; B60L 11/1874; B60L 8/003; B60L 11/005; B60L 15/2018; B60K 2350/2013; B60K 2350/2056; B60K 2350/2052; B60K 6/442; B60K 17/356; B60K 1/02; B60K 23/08; B60K 2006/4816
USPC .................. 701/22, 70, 93, 102, 104, 36
See application file for complete search history.

(56) References Cited

U.S. PATENT DOCUMENTS

| | | | |
|---|---|---|---|
| 6,137,250 A | 10/2000 | Hirano et al. | |
| 6,177,773 B1* | 1/2001 | Nakano | B60K 6/28 180/65.26 |
| 6,554,088 B2 | 4/2003 | Severinsky et al. | |
| 7,216,729 B2 | 5/2007 | Syed et al. | |
| 8,018,190 B2 | 9/2011 | Claeys et al. | |
| 8,082,089 B2 | 12/2011 | Morgan et al. | |
| 8,657,045 B2 | 2/2014 | Wang et al. | |
| 8,834,317 B2 | 9/2014 | Wang et al. | |
| 9,145,146 B2 | 9/2015 | Bureau et al. | |
| 2001/0039230 A1 | 11/2001 | Severinsky et al. | |
| 2002/0173391 A1 | 11/2002 | Endo et al. | |
| 2004/0026141 A1 | 2/2004 | Notsu et al. | |
| 2004/0210356 A1* | 10/2004 | Wilton | B60L 3/0046 701/22 |
| 2005/0256631 A1 | 11/2005 | Cawthorne | |
| 2006/0021808 A1 | 2/2006 | McGee et al. | |
| 2006/0108956 A1* | 5/2006 | Clark | B60L 3/108 318/139 |
| 2006/0231304 A1* | 10/2006 | Severinsky | B60H 1/004 180/65.23 |
| 2007/0112496 A1 | 5/2007 | Ji | |
| 2007/0173372 A1 | 7/2007 | Ueno | |
| 2007/0293994 A1 | 12/2007 | Zerbini et al. | |
| 2008/0029319 A1 | 2/2008 | Fleckner et al. | |
| 2008/0091314 A1* | 4/2008 | Hayashi | B60K 6/48 701/22 |
| 2008/0105477 A1* | 5/2008 | Abe | B60K 6/365 180/65.265 |
| 2008/0121443 A1* | 5/2008 | Clark | B60L 3/108 180/65.1 |
| 2008/0146407 A1 | 6/2008 | Tuckfield | |
| 2008/0297073 A1 | 12/2008 | Yatabe et al. | |
| 2009/0306843 A1 | 12/2009 | Jinno et al. | |
| 2009/0321161 A1 | 12/2009 | Tang | |
| 2010/0030416 A1 | 2/2010 | Jinno | |
| 2010/0030447 A1 | 2/2010 | Smyth et al. | |
| 2010/0038159 A1 | 2/2010 | Jinno et al. | |
| 2010/0063661 A1 | 3/2010 | Saito | |
| 2010/0106355 A1 | 4/2010 | Hattori et al. | |
| 2010/0131217 A1 | 5/2010 | Ichikawa | |
| 2010/0145560 A1 | 6/2010 | Komatsu et al. | |
| 2010/0152938 A1 | 6/2010 | Aoki et al. | |
| 2010/0250041 A1 | 9/2010 | Li | |
| 2010/0300781 A1 | 12/2010 | Leone | |
| 2011/0071748 A1 | 3/2011 | Nishigaki et al. | |
| 2011/0082611 A1 | 4/2011 | Shiba | |
| 2011/0130906 A1 | 6/2011 | Mayer | |
| 2011/0130916 A1 | 6/2011 | Mayer | |
| 2011/0166733 A1 | 7/2011 | Yu et al. | |
| 2011/0172865 A1 | 7/2011 | Liang et al. | |
| 2011/0269599 A1 | 11/2011 | Nakasako | |
| 2011/0276209 A1 | 11/2011 | Suganuma et al. | |
| 2011/0288708 A1 | 11/2011 | Katono et al. | |
| 2011/0307130 A1 | 12/2011 | Gow et al. | |
| 2012/0072063 A1 | 3/2012 | Kato et al. | |
| 2012/0082536 A1 | 4/2012 | Kawashima et al. | |
| 2012/0083948 A1 | 4/2012 | Tate, Jr. et al. | |
| 2012/0323430 A1* | 12/2012 | Nakamura | B60L 11/1803 701/22 |
| 2013/0030634 A1 | 1/2013 | Endo et al. | |
| 2013/0060409 A1* | 3/2013 | Matsushita | B60K 6/442 701/22 |
| 2013/0124026 A1 | 5/2013 | Ueno et al. | |
| 2013/0166122 A1 | 6/2013 | Iino | |
| 2013/0173107 A1* | 7/2013 | Kokon | B60W 10/06 701/22 |
| 2013/0245912 A1 | 9/2013 | Boot | |
| 2013/0249488 A1 | 9/2013 | Ju et al. | |
| 2013/0253743 A1 | 9/2013 | Maruyama et al. | |
| 2013/0304295 A1 | 11/2013 | Tagawa et al. | |
| 2014/0076085 A1 | 3/2014 | Walters et al. | |
| 2014/0077941 A1 | 3/2014 | Yamamura et al. | |
| 2014/0156132 A1 | 6/2014 | Ichimoto | |
| 2014/0163803 A1 | 6/2014 | Kamatani et al. | |
| 2014/0229043 A1 | 8/2014 | Frank et al. | |
| 2014/0244087 A1 | 8/2014 | Jeong et al. | |
| 2014/0274522 A1 | 9/2014 | Davis et al. | |
| 2014/0288757 A1 | 9/2014 | Hirasawa et al. | |
| 2015/0002053 A1 | 1/2015 | Endo et al. | |
| 2015/0039167 A1 | 2/2015 | Ideshio et al. | |
| 2015/0126329 A1 | 5/2015 | Johri et al. | |
| 2015/0134160 A1 | 5/2015 | Liang et al. | |
| 2015/0291149 A1 | 10/2015 | Kitabatake et al. | |
| 2015/0336558 A1 | 11/2015 | Yamazaki | |
| 2015/0367843 A1 | 12/2015 | West et al. | |

(56) References Cited

U.S. PATENT DOCUMENTS

| | | | |
|---|---|---|---|
| 2016/0221570 A1 | 8/2016 | Chen et al. | |
| 2016/0221571 A1 | 8/2016 | Chen et al. | |
| 2016/0325728 A1* | 11/2016 | Yang | B60L 3/108 |
| 2017/0036662 A1 | 2/2017 | Chen et al. | |

FOREIGN PATENT DOCUMENTS

| | | |
|---|---|---|
| CN | 1665697 | 9/2005 |
| CN | 1895942 | 1/2007 |
| CN | 1944139 | 4/2007 |
| CN | 101096180 | 1/2008 |
| CN | 101125548 | 2/2008 |
| CN | 101161523 A | 4/2008 |
| CN | 101186209 A | 5/2008 |
| CN | 101214797 | 7/2008 |
| CN | 101402314 A | 4/2009 |
| CN | 201214410 Y | 4/2009 |
| CN | 101445044 | 6/2009 |
| CN | 101445105 | 6/2009 |
| CN | 101587212 | 11/2009 |
| CN | 101618718 A | 1/2010 |
| CN | 101652538 A | 2/2010 |
| CN | 101674950 A | 3/2010 |
| CN | 101687507 A | 3/2010 |
| CN | 101830219 A | 9/2010 |
| CN | 101830222 A | 9/2010 |
| CN | 102009651 | 4/2011 |
| CN | 102009652 A | 4/2011 |
| CN | 102030005 A | 4/2011 |
| CN | 102126496 A | 7/2011 |
| CN | 102166963 A | 8/2011 |
| CN | 102180169 A | 9/2011 |
| CN | 102224047 A | 10/2011 |
| CN | 102267458 A | 12/2011 |
| CN | 102336148 A | 2/2012 |
| CN | 102358283 A | 2/2012 |
| CN | 102427980 A | 4/2012 |
| CN | 102490722 A | 6/2012 |
| CN | 102612448 A | 7/2012 |
| CN | 102658817 A | 9/2012 |
| CN | 102712313 A | 10/2012 |
| CN | 102745092 A | 10/2012 |
| CN | 102815295 | 12/2012 |
| CN | 102849064 A | 1/2013 |
| CN | 102849066 A | 1/2013 |
| CN | 103158695 A | 6/2013 |
| CN | 103189258 A | 7/2013 |
| CN | 103201153 A | 7/2013 |
| CN | 103249624 A | 8/2013 |
| CN | 103269926 A | 8/2013 |
| DE | 102007016515 A1 | 10/2008 |
| DE | 102009039615 | 3/2011 |
| DE | 102010060681 | 5/2012 |
| DE | 102011122307 | 6/2013 |
| EP | 0 867 323 A2 | 9/1998 |
| EP | 1 813 794 A1 | 8/2007 |
| EP | 2 063 088 A1 | 5/2009 |
| EP | 2 112 015 A1 | 10/2009 |
| EP | 2 127 981 A1 | 12/2009 |
| EP | 2 133 252 A1 | 12/2009 |
| EP | 2 168 827 A1 | 3/2010 |
| EP | 2 226 229 A1 | 9/2010 |
| EP | 2 308 732 A1 | 4/2011 |
| EP | 2 371 645 A1 | 10/2011 |
| EP | 2 371 646 A1 | 10/2011 |
| EP | 2 409 871 A2 | 1/2012 |
| EP | 2 460 704 A1 | 6/2012 |
| EP | 2 546 089 A2 | 1/2013 |
| JP | 2006-050704 A | 2/2006 |
| JP | 2006-094626 | 4/2006 |
| JP | 2006-183547 A | 7/2006 |
| JP | 2008-128192 | 6/2008 |
| JP | 2008-168700 | 7/2008 |
| JP | 2008271781 | 11/2008 |
| JP | 2009-090735 | 4/2009 |
| JP | 2009-166516 | 7/2009 |
| JP | 2009-198223 | 9/2009 |
| JP | 2010-179789 A | 8/2010 |
| JP | 2010-241260 | 10/2010 |
| JP | 2010-242575 A | 10/2010 |
| JP | 2011-189814 A | 9/2011 |
| JP | 2011-213166 | 10/2011 |
| JP | 2012-086701 A | 5/2012 |
| JP | 2012-091563 | 5/2012 |
| JP | 2013-086704 | 5/2013 |
| KR | 100887797 B1 | 3/2009 |
| WO | WO 2008/108498 A1 | 9/2008 |
| WO | WO 2009/008546 A1 | 1/2009 |
| WO | WO-2010/143077 A2 | 12/2010 |
| WO | WO 2012/059999 A1 | 5/2012 |
| WO | WO-2012/123486 | 9/2012 |
| WO | WO-2012/153395 | 11/2012 |
| WO | WO-2013/084333 | 6/2013 |
| WO | WO-2013/110706 A1 | 8/2013 |
| WO | WO 2013/072992 A1 | 4/2015 |

OTHER PUBLICATIONS

EPO machine translation of DE 102010060681 (original DE document dated May 24, 2012), 4 pages.
Extended European Search Report for European Patent Application No. 14841488.1 dated May 4, 2017, 9 pages.
Extended European Search Report for European Patent Application No. 14842235.5 dated Apr. 20, 2017, 8 pages.
Extended European Search Report for European Patent Application No. 14842364.3 dated Apr. 11, 2017, 11 pages.
Extended European Search Report for European Patent Application No. 14842391.6 dated Apr. 20, 2017, 9 pages.
Extended European Search Report for European Patent Application No. 14842721.4 dated Apr. 20, 2017, 8 pages.
Extended European Search Report for European Patent Application No. 14842854.3 dated May 11, 2017, 10 pages.
Extended European Search Report for European Patent Application No. 14843096.0 dated Apr. 20, 2017, 8 pages.
JPO machine translation of JP 2010-241260 (original JP document dated Oct. 28, 2010), 16 pages.
Office Action for U.S. Appl. No. 14/917,881 dated Jun. 26, 2017, 16 pages.
Office Action for U.S. Appl. No. 14/917,895 dated Apr. 7, 2017, 31 pages.
Office Action for U.S. Appl. No. 14/917,895 dated Sep. 5, 2017, 13 pages.
Office Action from Chinese Patent Application No. 201310444535.3 dated Jun. 16, 2016, with English translation, 21 pages.
Search Report for Chinese Patent Application No. 201310444535.3 dated Dec. 23, 2013, 5 pages.
International Search Report and Written Opinion from International Application No. PCT/CN2014/085825 dated Nov. 13, 2014.
International Search Report and Written Opinion from International Application No. PCT/CN2014/085826 dated Nov. 15, 2014.
International Search Report and Written Opinion from International Application No. PCT/CN2014/085828 dated Dec. 1, 2014.
International Search Report and Written Opinion from International Application No. PCT/CN2014/085829 dated Dec. 3, 2014.
International Search Report and Written Opinion from International Application No. PCT/CN2014/085830 dated Nov. 19, 2014.
International Search Report and Written Opinion from International Application No. PCT/CN2014/086018 dated Dec. 17, 2014.
International Search Report and Written Opinion from International Application No. PCT/CN2014/086023 dated Dec. 12, 2014.
International Search Report and Written Opinion from International Application No. PCT/CN2014/086025 dated Dec. 10, 2014.
International Search Report and Written Opinion from International Application No. PCT/CN2014/086031 dated Dec. 3, 2014.
Office Action from Chinese Patent Application No. 201310405003.9 dated Dec. 11, 2013.
Office Action from Chinese Patent Application No. 201310444535.3 dated Dec. 11, 2013.

(56) References Cited

OTHER PUBLICATIONS

Office Action for U.S. Appl. No. 14/917,878 dated Dec. 7, 2016.
Office Action for U.S. Appl. No. 14/917,907 dated Oct. 20, 2017, 19 pages.
Office Action for U.S. Appl. No. 14/917,887 dated Nov. 16, 2017, 9 pages.
Office Action for U.S. Appl. No. 14/917,881 dated Dec. 8, 2017, 9 pages.
Office Action for U.S. Appl. No. 14/917,895 dated Jan. 8, 2018, 39 pages.
Office Action for U.S. Appl. No. 14/917,866 dated Jan. 9, 2018, 38 pages.

* cited by examiner

VEHICLE AND SLIDING FEEDBACK CONTROL SYSTEM OF VEHICLE AND METHOD FOR THE SAME

CROSS REFERENCE TO RELATED APPLICATION

This application claims priority and benefits of Chinese Patent Application No. 201310405003.9, filed with State Intellectual Property Office on Sep. 9, 2013, the entire content of which is incorporated herein by reference.

FIELD

Embodiments of the present disclosure generally relate to a vehicle technology filed, and more particularly, to a vehicle, a sliding feedback control system of the vehicle and a sliding feedback control method of the vehicle.

BACKGROUND

An electric vehicle uses a power battery as a power source. A problem of the electric vehicle is how to improve a driving energy efficiency of the electric vehicle so as to extend a driving distance of the electric vehicle. An energy feedback is one effective measure to solve the above problem.

The energy feedback includes braking feedback and sliding feedback. During a sliding feedback of the electric vehicle, a motor controller controls an electric motor to feedback according to a calculated feedback torque, so as to charge the power battery, to increase the driving distance of the electric vehicle, and to reduce the pollutant emission and the wear caused by the mechanical brake.

Now, a sliding feedback control system and method of a vehicle has already been provided. The method includes: calculating an initial feedback torque value of the electric motor according to a current speed of the vehicle and a calibrated sliding deceleration; calculating a constraint feedback torque value of the power battery according to a temperature and a SOC (State of Charge) of the power battery; calculating a constraint feedback torque value of the electric motor according to a rotating speed of the electric motor; determining a final feedback torque value of the electric motor as a minimum of the initial feedback torque value of the electric motor, the constraint feedback torque value of the power battery and the constraint feedback torque value of the electric motor; and controlling the vehicle to recovery the sliding energy according to the final feedback torque value of the electric motor.

Although the above method can calculate the final feedback torque value of the electric motor to improve the efficiency of recovering the sliding energy of the vehicle, there are still some problems: a constraint feedback torque value of the motor controller is not calculated in the above method, and thus an influence of a current state of the motor controller on the feedback torque value of the electric motor is not fully considered, in which the current state of the motor controller influences an output power of the electric motor directly and thus influences the feedback torque value of the electric motor; in addition, the above method does not fully consider the influence of the current road condition and the working mode of the vehicle on the sliding feedback of the vehicle. Thus, the final feedback torque value of the electric motor calculated by the above method is not perfect, which may influence the sliding feedback efficiency of the vehicle.

SUMMARY

Embodiments of the present disclosure seek to solve at least one of the problems existing in the related art to at least some extent.

A first object of the present disclosure is to provide a sliding feedback control system of a vehicle, which can fully consider an influence of a current state of the motor controller, a current road condition and a working mode of the vehicle on the sliding feedback, thus enhancing an accuracy of calculating a final feedback torque value of an electric motor, improving an sliding feedback efficiency of the vehicle and keeping a comfort of the vehicle.

A second object of the present disclosure is to provide a vehicle.

A third object of the present disclosure is to provide a sliding feedback control method of the vehicle.

In order to achieve above objects, embodiments of a first aspect of the present disclosure provide a sliding feedback control system of the vehicle, including: an electric motor; a power battery configured to supply power to the electric motor; a battery manager connected with the power battery, and configured to obtain a current state of the power battery, and to obtain a maximum charging power of the power battery according to the current state of the power battery; and a motor controller connected with the electric motor, and configured to obtain current states of the motor controller and the electric motor, to obtain maximum feedback torque values of the motor controller and the electric motor respectively according to the current states of the motor controller and the electric motor, to convert the max charging power of the power battery into a maximum feedback torque value of the power battery, to determine a minimum of the maximum feedback torque value of the power battery, the maximum feedback torque value of the motor controller and the maximum feedback torque value of the electric motor as a first feedback torque value, to obtain a second feedback torque value according to a current speed of the vehicle, a current road slope value, a current working mode of the vehicle and a predetermined feedback torque curve, and to determine a minimum of the first feedback torque value and the second feedback torque value as a final feedback torque value of the electric motor, such that the electric motor controls the vehicle to perform a sliding feedback operation according to the final feedback torque value.

With the sliding feedback control system of the vehicle according to embodiments of the present disclosure, by calculating the maximum feedback torque value of the motor controller according to the current state of the motor controller, and comparing the maximum feedback torque value of the power battery, the maximum feedback torque value of the motor controller and the maximum feedback torque value of the electric motor to obtain the minimum value as the first feedback value, the impact of the current state of the motor controller on the sliding feedback of the vehicle is fully considered. In addition, by storing the predetermined feedback torque curve in the motor controller and calculating the second feedback torque value according to the current speed of the vehicle, the current road slope value, the current working mode of the vehicle and the predetermined feedback torque curve, the impact of the current road condition and the working mode of the vehicle on the sliding feedback of the vehicle is also fully considered. Finally, by comparing the first feedback torque value with the second feedback torque value to obtain the minimum value as the final feedback torque value of the electric motor, the accuracy of the final feedback torque value of the electric motor is enhanced, thus improving the sliding feedback efficiency of the vehicle and keeping the comfort of the vehicle.

In order to achieve the above objects, embodiments of a second aspect of the present disclosure provide a vehicle, including the above sliding feedback control system.

With the vehicle according to embodiments of the present disclosure, by calculating the maximum feedback torque value of the motor controller according to the current state of the motor controller, and comparing the maximum feedback torque value of the power battery, the maximum feedback torque value of the motor controller and the maximum feedback torque value of the electric motor to obtain the minimum value as the first feedback value, the impact of the current state of the motor controller on the sliding feedback of the vehicle is fully considered. In addition, by storing the predetermined feedback torque curve in the motor controller and calculating the second feedback torque value according to the current speed of the vehicle, the current road slope value, the current working mode of the vehicle and the predetermined feedback torque curve, the impact of the current road condition and the working mode of the vehicle on the sliding feedback of the vehicle is also fully considered. Finally, by comparing the first feedback torque value with the second feedback torque value to obtain the minimum value as the final feedback torque value of the electric motor, the accuracy of the final feedback torque value of the electric motor is enhanced, thus improving the sliding feedback efficiency of the vehicle and keeping the comfort of the vehicle.

In order to achieve the above objects, embodiments of a third aspect of the present disclosure provide a sliding feedback control method of the vehicle, including: obtaining a current state of a power battery and obtaining a maximum charging power of the power battery according to the current state of the power battery; obtaining current states of a motor controller and an electric motor, and obtaining maximum feedback torque values of the motor controller and the electric motor respectively according to the current states of the motor controller and the electric motor; converting the maximum charging power of the power battery into a maximum feedback torque value of the power battery; comparing the maximum feedback torque value of the power battery, the maximum feedback torque value of the motor controller and the maximum feedback torque value of the electric motor to obtain a first minimum value, and determining the first minimum value as a first feedback torque value; obtaining a second feedback torque value according to a current speed of the vehicle, a current road slope value, a current working mode of the vehicle and a predetermined feedback torque curve; comparing the first feedback torque value with the second feedback torque value to obtain a second minimum value, and determining the second minimum value as a final feedback torque value of the electric motor; and controlling the vehicle to perform a sliding feedback operation according to the final feedback torque value of the electric motor.

With the method for the sliding feedback control system of the vehicle according to embodiments of the present disclosure, by calculating the maximum feedback torque value of the motor controller according to the current state of the motor controller, and comparing the maximum feedback torque value of the power battery, the maximum feedback torque value of the motor controller and the maximum feedback torque value of the electric motor to obtain the minimum value as the first feedback value, the impact of the current state of the motor controller on the sliding feedback of the vehicle is fully considered. In addition, by storing the predetermined feedback torque curve in the motor controller and calculating the second feedback torque value according to the current speed of the vehicle, the current road slope value, the current working mode of the vehicle and the predetermined feedback torque curve, the impact of the current road condition and the working mode of the vehicle on the sliding feedback of the vehicle is also fully considered. Finally, by comparing the first feedback torque value with the second feedback torque value to obtain the minimum value as the final feedback torque value of the electric motor, the accuracy of the final feedback torque value of the electric motor is enhanced, thus improving the sliding feedback efficiency of the vehicle and keeping the comfort of the vehicle.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
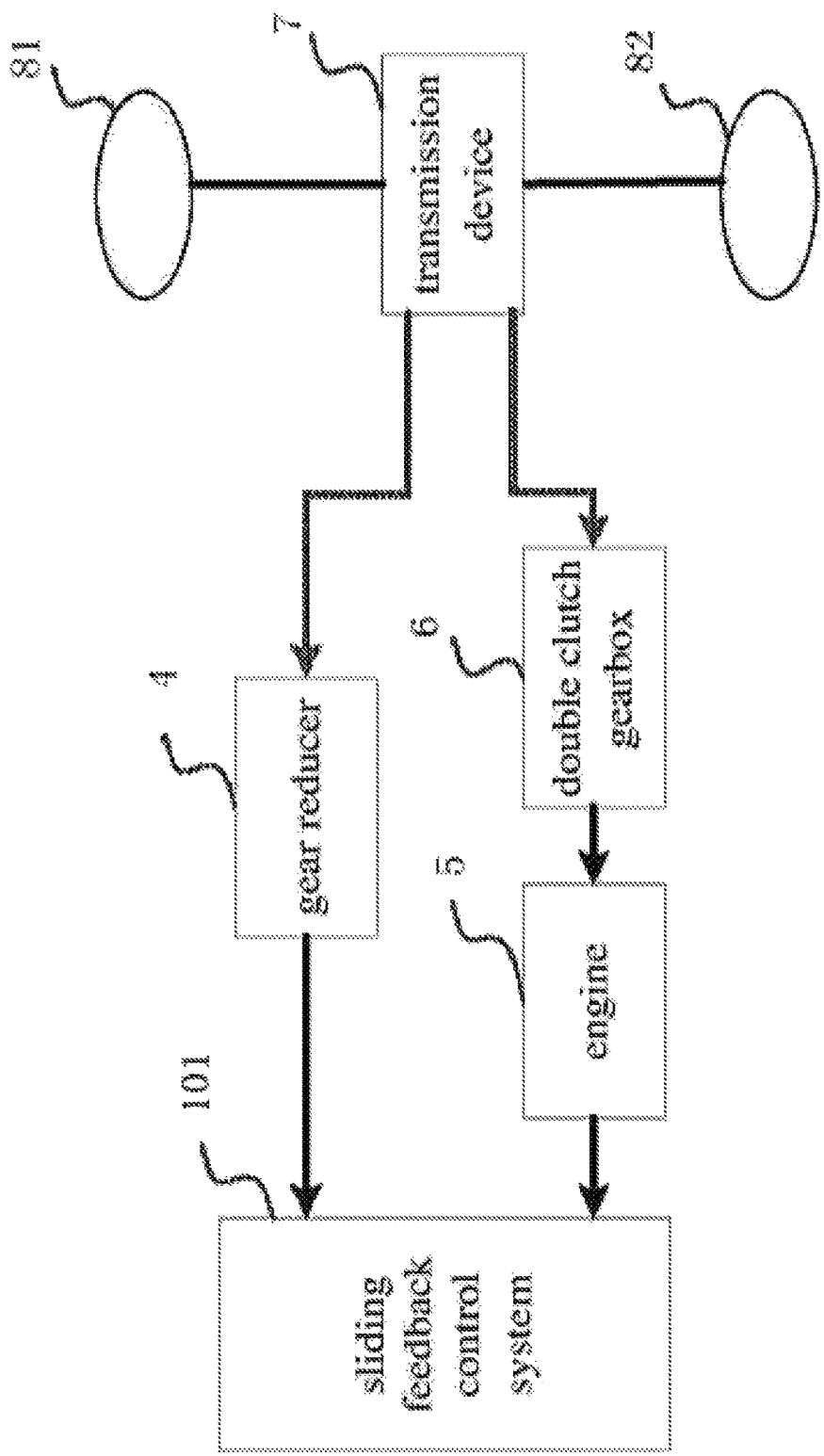
FIG. 1 is a schematic diagram of a vehicle according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

The following description provides a plurality of embodiments or examples configured to achieve different structures of the present disclosure. In order to simplify the publishment of the present disclosure, components and dispositions of the particular embodiment are described in the following, which are only explanatory and not construed to limit the present disclosure. In addition, the present disclosure may repeat the reference number and/or letter in different embodiments for the purpose of simplicity and clarity, and the repeat does not indicate the relationship of the plurality of embodiments and/or dispositions. Moreover, in description of the embodiments, the structure of the second characteristic "above" the first characteristic may include an embodiment formed by the first and second characteristic contacted directly, and also may include another embodiment formed between the first and the second characteristic, in which the first characteristic and the second characteristic may not contact directly.

In the description of the present disclosure, unless specified or limited otherwise, it should be noted that, terms "mounted," "connected" and "coupled" may be understood broadly, such as electronic connection or mechanical connection, inner communication between two elements, direct connection or indirect connection via intermediary. These having ordinary skills in the art should understand the specific meanings in the present disclosure according to specific situations.

With reference to the following descriptions and drawings, these and other aspects of embodiments of the present disclosure will be distinct. In the descriptions and drawings, some particular embodiments are described in order to show means of the principles of embodiments according to the present disclosure, however, it should be appreciated that the scope of embodiments according to the present disclosure is not limited. On the contrary, embodiments of the present disclosure include all the changes, alternatives, and modifications falling into the scope of the spirit and principles of the attached claims.

In the following, a vehicle, a sliding feedback control system of the vehicle and a sliding feedback control method of the vehicle are described in detail with reference to drawings.

FIG. 1 is a schematic diagram of the vehicle according to an embodiment of the present disclosure. As shown in FIG. 1, the vehicle includes the sliding feedback control system 101, a transmission device 7, wheels 81 and 82, a gear reducer 4, a double clutch gearbox 6 and an engine 5. The engine 5 is connected with the transmission device 7 via the double clutch gearbox 6, the transmission device 7 is configured to drive the wheels 81 and 82 of the vehicle, and the sliding feedback control system 101 is connected with the transmission device 7 via the gear reducer 4.

Figure 2:
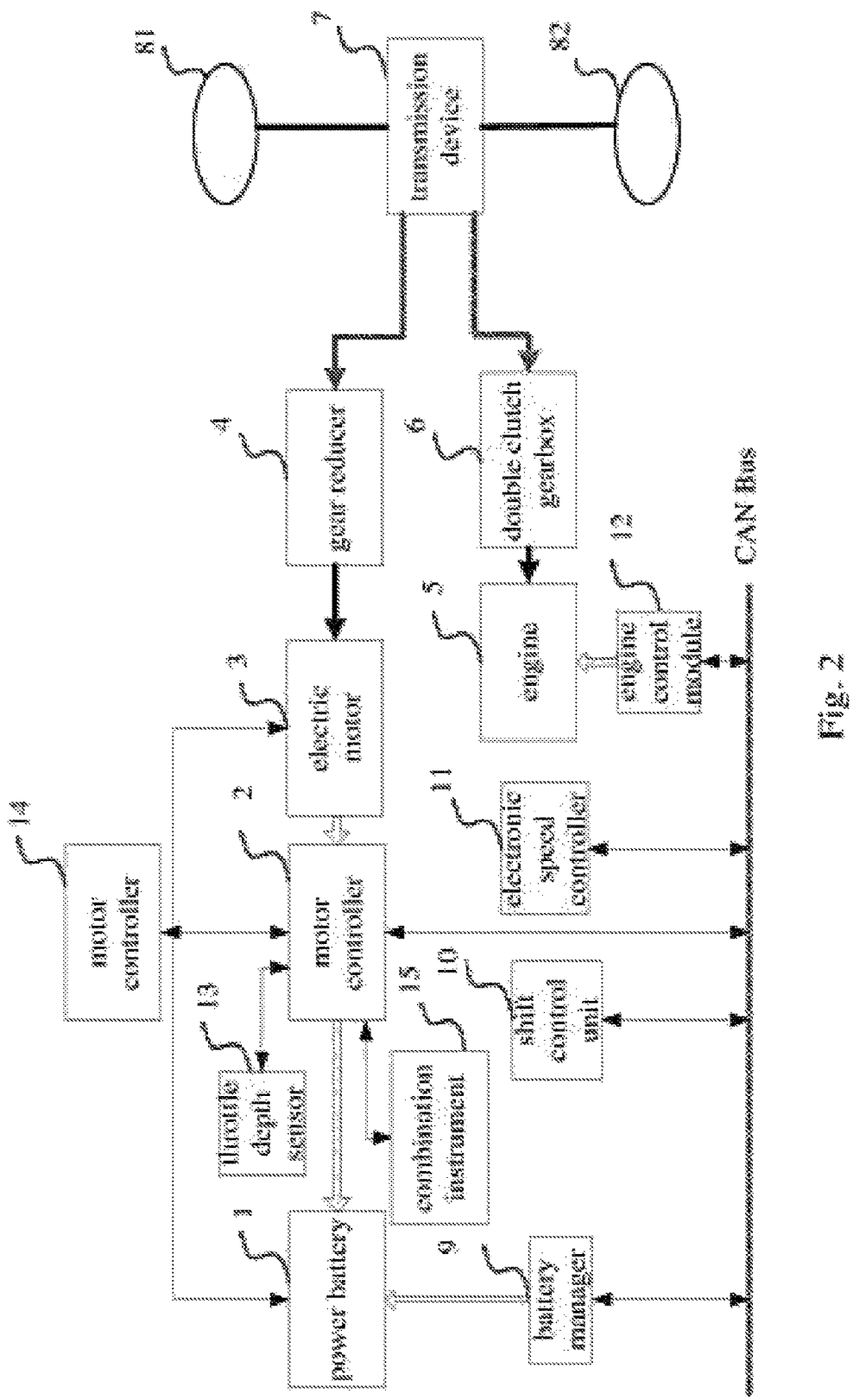
FIG. 2 is a schematic diagram of a sliding feedback control system of a vehicle according to an embodiment of the present disclosure.
Figure 3:
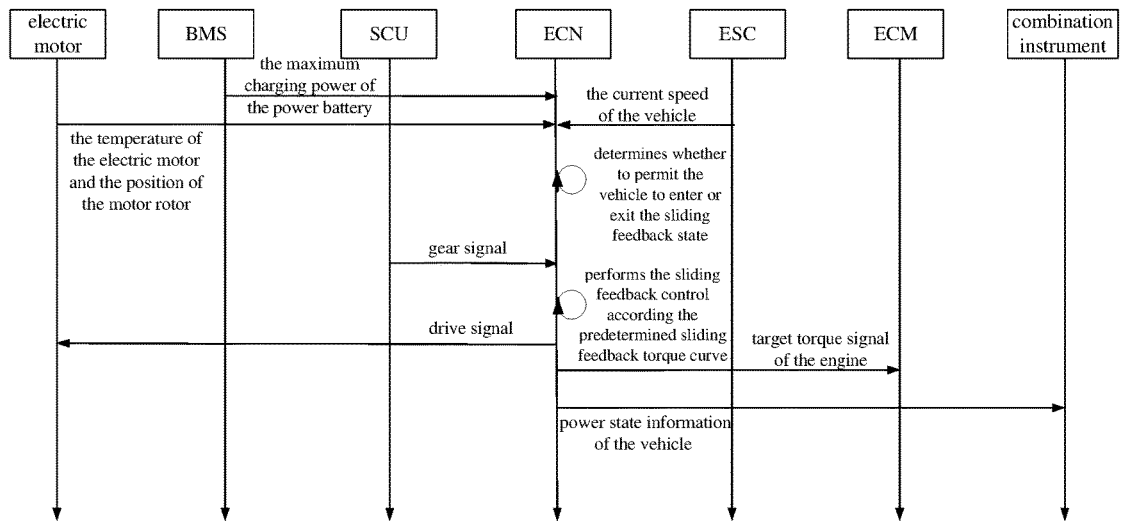
FIG. 3 is a schematic diagram showing a signal flow of a sliding feedback control system of a vehicle according to an embodiment of the present disclosure.

FIG. 2 is a schematic diagram of the sliding feedback control system of the vehicle according to an embodiment of the present disclosure. FIG. 3 is a schematic diagram showing a signal flow of the sliding feedback control system of the vehicle according to an embodiment of the present disclosure. As shown in FIG. 2, the sliding feedback control system 101 of the vehicle includes a power battery 1, a battery manager 9, an electric motor 3 and a motor controller 2. The power battery 1 is used as a power storage unit. The motor controller 2 is connected with the power battery 1 via a DC bus, and is connected with the electric motor 3 via an AC three-phase wire. The electric motor 3 is connected with the transmission device 7 via the gear reducer 4 and outputs a feedback torque to the transmission device 7 via the gear reducer 4, such that the transmission device 7 transfers the feedback torque of the electric motor 3 to the wheels 81 and 82.

In an embodiment of the present disclosure, the sliding feedback control of the vehicle refers to the sliding feedback control performed when an accelerator pedal of the vehicle is completely released. When the vehicle enters the sliding feedback state, the accelerator pedal of the vehicle is completely released, such that, on one hand, the electric motor 3 provides a resistance to the wheels 81 and 82 so as to slow down the vehicle, and on the other hand, the energy is sent from the wheels 81 and 82 to the transmission device 7 and then sent to the electric motor 3 via the transmission device 7 and the gear reducer 4, the electric motor 3 starts the generating function to convert the mechanical energy into an electric energy and sends the electric energy to the motor controller 2, the motor controller 2 rectifies a three-phase AC into a suitable DC to charge the power battery 1.

In an embodiment of the present disclosure, the sliding feedback control system 101 is connected with the double clutch gearbox 6 via the engine 5. When the vehicle enters the sliding feedback state, the accelerator pedal of the vehicle is completely released, the vehicle tends to slow down, and the energy is sent from the wheels 81 and 82 to the transmission device 7 and then sent to the engine 5 via the transmission device 7 and the double clutch gearbox 6. At this time, the vehicle does not provide fuel to the engine 5, and the energy transferred to the engine 5 from the wheels 81 and 82 can maintain a normal operation of the engine 5.

In an embodiment of the present disclosure, the battery manager 9 is connected with the power battery 1, and is configured to obtain a current state of the power battery 1 and to obtain a maximum charging power of the power battery 1 according to the current state of the power battery 1. The motor controller 2 is configured to obtain current states of the motor controller and the electric motor, to obtain maximum feedback torque values of the motor controller and the electric motor respectively according to the current states of the motor controller and the electric motor, to convert the maximum charging power of the power battery into a maximum feedback torque value of the power battery, and to determine a minimum of the maximum feedback torque value of the power battery, the maximum feedback torque value of the motor controller and the maximum feedback torque value of the electric motor as a first feedback torque value. The motor controller 2 is also configured to obtain a second feedback torque value according to a current speed of the vehicle, a current road slope value, a current working mode of the vehicle and a predetermined feedback torque curve, and to compare the first feedback torque value with the second feedback torque value to determine a minimum of them as a final feedback torque value of the electric motor 3. The electric motor 3 is configured to control the vehicle to perform a sliding feedback operation according to the final feedback torque value.

With the sliding feedback control system of the vehicle according to embodiments of the present disclosure, by calculating the maximum feedback torque value of the motor controller according to the current state of the motor controller, and comparing the maximum feedback torque value of the power battery, the maximum feedback torque value of the motor controller and the maximum feedback torque value of the electric motor to obtain the minimum value as the first feedback value, the impact of the current state of the motor controller on the sliding feedback of the vehicle is fully considered. In addition, by storing the predetermined feedback torque curve in the motor controller and calculating the second feedback torque value according to the current speed of the vehicle, the current road slope value, the current working mode of the vehicle and the predetermined feedback torque curve, the impact of the current road condition and the working mode of the vehicle on the sliding feedback of the vehicle is also fully considered. Finally, by comparing the first feedback torque value with the second feedback torque value to obtain the minimum value as the final feedback torque value of the electric motor, the accuracy of the final feedback torque value of the electric motor is enhanced, thus improving the sliding feedback efficiency of the vehicle and keeping the comfort of the vehicle.

In an embodiment of the present disclosure, the current state of the power battery 1 obtained by the battery manager 9 includes an electric quantity and a temperature of the power battery. The current electric quantity of the power battery directly influences the maximum charging power of the power battery. Generally, the current electric quantity of the power battery is inversely proportional to the maximum charging power of the power battery. The temperature of the power battery influences an internal performance of the power battery, and when the temperature of the power battery is too high or too low, an abnormal situation will be caused in the power battery 1, thus affecting the maximum charging power of the power battery.

In an embodiment of the present disclosure, the current state of the motor controller includes the temperature of the motor controller. The motor controller 2 is configured to drive the electric motor 3, and the current state of the motor controller directly affects the output power of the electric motor and also affects the feedback torque of the electric motor, and thus the maximum feedback torque value of the motor controller is calculated in the present disclosure. The temperature of the motor controller directly affects the maximum feedback torque value of the motor controller. Generally, the temperature of the motor controller is inversely proportional to the maximum feedback torque value of the motor controller. When the temperature of the motor controller is high, the maximum feedback torque value of the motor controller is low. At this time, if the electric motor 3 performs the sliding feedback operation according to the larger maximum feedback torque value of the motor controller, a current in a main circuit of the motor controller 2 is caused to be higher to generate greater heat, which seriously affects the performance of the motor controller 2 and even causes a failure of the motor controller 2.

In an embodiment of the present disclosure, the current state of the electric motor obtained by the motor controller 2 includes the temperature of the electric motor and a position of a motor rotor. The temperature of the electric motor directly affects the maximum feedback torque value of the electric motor. Generally, the temperature of the electric motor is inversely proportional to the maximum feedback torque value of the electric motor. If the temperature of the electric motor is high and the electric motor 3 performs the sliding feedback operation according to a larger maximum feedback torque value of the electric motor, the temperature of the electric motor will rise sharply, which seriously affects the performance of the electric motor 3 and even causes a failure of the electric motor 3. In addition, the electric motor 3 drives the vehicle to perform the sliding feedback operation according to the position of the motor rotor. In another embodiment of the present disclosure, the motor controller 2 further obtains a rated power and a current rotating speed of the electric motor, in which the rated power of the electric motor affects the maximum feedback torque value of the vehicle, and the current rotating speed of the electric motor directly affects the current feedback torque value of the vehicle.

In an embodiment of the present disclosure, the sliding feedback control system 101 of the vehicle further includes: an electronic speed controller 11, configured to sample the current speed of the vehicle; a throttle depth sensor 13, configured to sample a current accelerator pedal depth value; a shift control unit 10, configured to sample a current gear signal of the vehicle; and a temperature sensor 14, connected with the power battery 1, the electric motor 3 and the motor controller 2 respectively, and configured to sample temperature values of the power battery 1, the electric motor 3 and the motor controller 2. The motor controller 2 is connected with the electronic speed controller 11, the throttle depth sensor 13 and the shift control unit 10 respectively. After the battery manager 9 obtains the current state of the power battery 1, the battery manager 9 calculates the maximum charging power of the power battery 1 according to the current state of the power battery, and then the motor controller 2 converts the maximum charging power of the power battery into the maximum feedback torque value of the power battery and sends the maximum feedback torque value of the power battery to a CAN bus. The shift control unit 10 sends the current gear signal of the vehicle to the CAN bus. The electronic speed controller 11 sends the current speed of the vehicle, state information of the anti-lock braking system and state information of the cruise control system to the CAN bus. The throttle depth sensor 13 sends the current accelerator pedal depth value to the CAN bus. The electric motor 3 samples the position of the motor rotor via sensors, and sends the position signal to the motor controller 2. The motor controller 2 obtains the current working mode of the vehicle, the state information of the anti-lock braking system, the state information of a cruise control system, and the signals sent by the electronic speed controller 11, the shift control unit 10, the throttle depth sensor 13 and the temperature sensor 14 via the CAN bus, and the motor controller 2 determines whether the vehicle is permitted to enter a sliding feedback state or to exit the sliding feedback state according to the above signals and information.

In an embodiment of the present disclosure, the motor controller 2 permits the vehicle to enter the sliding feedback state when the following conditions are satisfied: (1) the current speed of the vehicle sampled by the electronic speed controller 11 is larger than or equal to a minimum vehicle speed threshold, this is because, if the vehicle enters the sliding feedback state when the current speed of the vehicle is less than the minimum vehicle speed threshold an obvious braking impact will be caused (which affects the comfort of the vehicle), and moreover, the energy from the sliding feedback is less due to the low speed of the vehicle (which makes the sliding feedback state of the vehicle not necessary). Generally, the minimum vehicle speed threshold is 13 km/h; (2) the current accelerator pedal depth value sampled by the throttle depth sensor is zero, this is because, the sliding feedback control of the vehicle in the present disclosure refers to the sliding feedback control performed when the accelerator pedal of the vehicle is completely released, and thus when the current accelerator pedal depth value sampled by the throttle depth sensor is zero, the vehicle is permitted to enter the sliding feedback state; (3) the anti-lock braking system is in a non-working state, this is because, when the anti-lock braking system works, it controls the vehicle to maintain a stable braking force, and if the vehicle enters the sliding feedback state at this time, it is difficult for the vehicle to maintain the stable braking force, which goes against the overall control of the vehicle; (4) the cruise control system is in the non-working state, this is because, when the cruise control system is working, the vehicle will maintain a predetermined speed, which is in conflict with the object of the sliding feedback of the vehicle (i.e. slowing down the vehicle); (5) the current gear signal sampled by the shift control unit is a D gear signal, this is because, the sliding feedback control of the vehicle in the present disclosure refers to a D-gear sliding feedback control performed when the accelerator pedal of the vehicle is completely released, and if the vehicle is performing the sliding feedback in N gear, a driving intention of a driver is generally considered as sliding a short distance in N gear, and the sliding feedback control is not needed.

In an embodiment of the present disclosure, the motor controller 2 is further configured to determine whether the vehicle is permitted to exit the sliding feedback state according to the current speed of the vehicle, the current accelerator pedal depth value, the current gear signal of the vehicle, the state information of the anti-lock braking system and the state information of the cruise control system. Specifically, the vehicle is permitted to exit the sliding feedback state when one of the following conditions is satisfied: (1) the current speed of the vehicle sampled by the electronic speed controller is less than the minimum vehicle speed threshold; (2) the current accelerator pedal depth value sampled by the throttle depth sensor is larger than zero; (3) the anti-lock braking system is in a working state; (4) the cruise control system is in the working state; (5) the current gear signal sampled by the shift control unit is a non-D gear signal.

The current working mode of the vehicle has a direct influence on the sliding feedback control, and specifically, an EV (Electric Vehicle) mode and a HEV (Hybrid Electric Vehicle) mode of the vehicle directly affects the sliding feedback control. When the vehicle performs the sliding feedback in the HEV mode, the engine 5 provides a resistance force to the vehicle, and when the vehicle performs the sliding feedback in the EV mode, the engine 5 does not provide the resistance force to the vehicle. Thus, the sliding feedback control methods in different modes are different.

As shown in FIG. 3, the shift control unit (SCU) is configured to sample a gear signal and to transmit the gear signal to the motor controller (ECN). The battery manager sends the maximum charging power of the power battery to the motor controller (ECN). The electric motor sends the temperature of the electric motor and the position of the motor rotor to the motor controller (ECN). The electronic speed controller (ESC) sends the current speed of the vehicle to the motor controller (ECN). The motor controller (ECN) determines whether to permit the vehicle to enter or exit the sliding feedback state according to the current speed of the vehicle, the current accelerator pedal depth value, the current gear signal of the vehicle, the state information of the anti-lock braking system and the state information of the cruise control system, controls the sliding feedback according the predetermined sliding feedback torque curve, and sends a drive signal to the electric motor 3 and sends a target torque signal of the engine to the engine control module (ECM). The combination instrument 15 is configured to display power state information of the vehicle.

In different speeds, the sliding feedback torque of the vehicle is different. When the speed of the vehicle is higher, the resistance of the vehicle is larger, and the sliding feedback torque is lower. At this time, if the sliding feedback torque is larger, the vehicle has the obvious braking impact, which affects the comfort of the vehicle. When the speed of the vehicle is moderate, the sliding feedback torque is larger due to economy of the operation region of the power system and the resistance of the vehicle. When the speed of the vehicle is lower, in order to keep the comfort of the vehicle, the sliding feedback torque is lower.

The road slope value also directly affects the sliding feedback control of the vehicle. During the vehicle drives downhill, when the current road slope value is larger than the maximum road slope value, the vehicle generally enters the braking state, at this time the vehicle enters the braking feedback control according to the intention of the driver. When the current road slope value is less than the maximum road slope value, if the vehicle slides in a constant speed, the sliding feedback torque value is larger, if the vehicle slides in a lower acceleration, the sliding feedback torque value is lower. Therefore, during the vehicle drives downhill, by calculating the sliding feedback torque value according to the current speed of the vehicle and the current road slope value, the sliding feedback efficiency of the vehicle is enhanced at the extreme and the comfort of the vehicle is kept.

Figure 4:
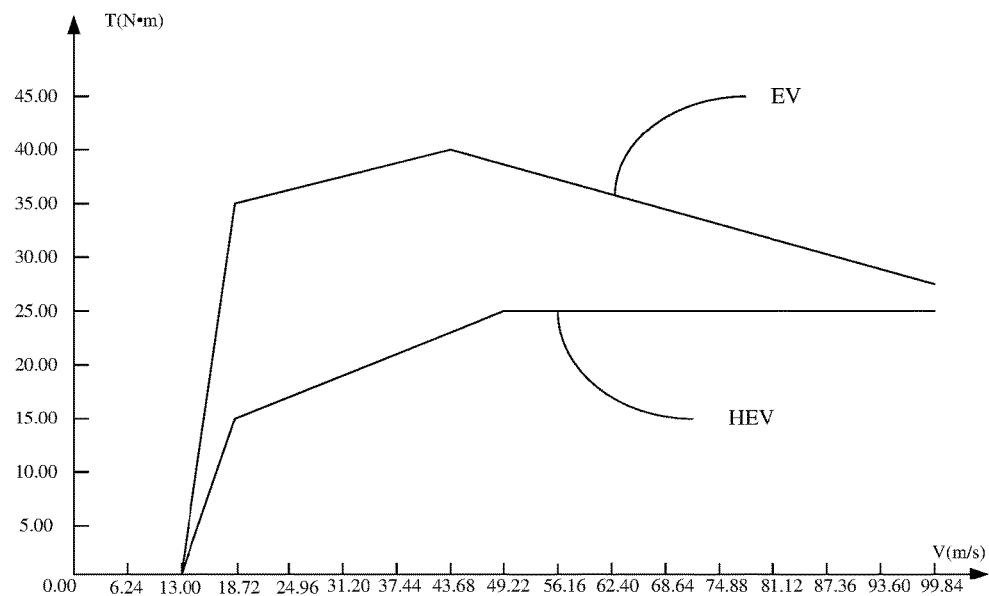
FIG. 4 is a schematic diagram showing a relationship between a speed of a vehicle and a feedback torque of a vehicle according to an embodiment of the present disclosure.

In an embodiment of the present disclosure, the motor controller 2 stores the predetermined feedback torque curve. As shown in FIG. 4, X-coordinate and Y-coordinate represent the current speed and the feedback torque respectively, and two curves are sliding feedback torque curves in the EHV mode and the HV mode of the vehicle. The sliding feedback torque curves at different road slope values are drawn by repeating test at different road slope values. As long as the current speed, the current road slope value and the working mode of the vehicle are known the corresponding sliding feedback torque value can be calculated according to the sliding feedback torque curve stored in the motor controller 2. FIG. 4 is the predetermined feedback torque curve at a certain road slope value (10°), and referring to FIG. 4, the motor controller 2 calculates the second feedback torque value according to the current speed and the current working mode of the vehicle. By fully considering the influence of the current speed of the vehicle, the current road slope value and the current working mode of the vehicle on the sliding feedback, a more accurate second feedback torque value is obtained, thus enhancing the sliding feedback efficiency of the vehicle.

In an embodiment of the present disclosure, the sliding feedback control system further includes a engine control module 12, and the engine control module 12 is configured to control an output torque of the engine 5 according to the target torque signal of the engine sent by the motor controller 2. When the vehicle is performing the sliding feedback in the HEV mode, the motor controller 2 sends the target torque signal of the engine to the engine control module 12, and then the engine control module 12 controls the output torque of the engine. In embodiments of the present disclosure, considering the intention of the driver and the economical efficiency, the engine 5 does not provide the output torque while the vehicle is in the sliding feedback state, and thus the target torque signal of the engine sent by the motor controller 2 is equal to zero. When the vehicle is in the EHV mode, the engine 5 does not work, and thus the motor controller 2 does not send the target torque signal of the engine to the engine control module 12.

In an embodiment of the present disclosure, the sliding feedback control system further includes the combination instrument 15, and the combination instrument 15 is configured to display power state information of the vehicle. The state information includes whether the vehicle is performing the sliding feedback in the EHV mode or in the HV mode.

Embodiments of the present disclosure further provide a sliding feedback control method of the vehicle. The method includes: obtaining a current state of a power battery and obtaining a maximum charging power of the power battery according to the current state of the power battery; obtaining current states of a motor controller and an electric motor, and obtaining maximum feedback torque values of the motor controller and the electric motor respectively according to the current states of the motor controller and the electric motor; converting the maximum charging power of the power battery into a maximum feedback torque value of the power battery; comparing the maximum feedback torque value of the power battery, the maximum feedback torque value of the motor controller and the maximum feedback torque value of the electric motor to obtain a first minimum value and determining the first minimum value as a first feedback torque value; obtaining a second feedback torque value according to a current speed of the vehicle, a current road slope value, a current working mode of the vehicle and a predetermined feedback torque curve; comparing the first feedback torque value with the second feedback torque value to obtain a second minimum value, and determining the second minimum value as a final feedback torque value of the electric motor; and controlling the vehicle to perform a sliding feedback operation according to the final feedback torque value of the electric motor.

With the sliding feedback control method of the vehicle according to embodiments of the present disclosure, by calculating the maximum feedback torque value of the motor controller according to the current state of the motor controller, and comparing the maximum feedback torque value of the power battery, the maximum feedback torque value of the motor controller and the maximum feedback torque value of the electric motor to obtain the minimum value as the first feedback value, the impact of the current state of the motor controller on the sliding feedback of the vehicle is fully considered. In addition, by storing the predetermined feedback torque curve in the motor controller and calculating the second feedback torque value according to the current speed of the vehicle, the current road slope value, the current working mode of the vehicle and the predetermined feedback torque curve, the impact of the current road condition and the working mode of the vehicle on the sliding feedback of the vehicle is also fully considered. Finally, by comparing the first feedback torque value with the second feedback torque value to obtain the minimum value as the final feedback torque value of the electric motor, the accuracy of the final feedback torque value of the electric motor is enhanced, thus improving the sliding feedback efficiency of the vehicle and keeping the comfort of the vehicle.

Specifically, when the vehicle is in the normally sliding feedback state, the second feedback torque value is less than the first feedback torque value, and thus the second feedback torque value is generally used as the final feedback torque value of the electric motor. The second feedback torque value is calculated by fully considering the influence of the current speed, the current road condition and the working mode of the vehicle on the sliding feedback of the vehicle, and thus the second feedback torque value is more accurate, which can enhance the sliding feedback efficiency of the vehicle and keep the comfort of the vehicle. When the power battery, the motor controller or the electric motor has a fault, in order to give consideration to the working performance of the electric motor, the motor controller and the power battery and to achieve the sliding feedback of the vehicle, the first feedback torque value is used as the final feedback torque value of the electric motor, which effectively ensures the sliding feedback efficiency of the vehicle and keep the comfort of the vehicle.

In an embodiment of the present disclosure, the current state of the power battery includes an electric quantity and a temperature of the power battery; the current state of the motor controller includes a temperature of the motor controller; the current state of the electric motor includes the temperature of the electric motor and the position of the motor rotor. In another embodiment of the present disclosure, the rated power and the current rotating speed of the electric motor are also obtained.

In an embodiment of the present disclosure, the sliding feedback control method of the vehicle further includes: sampling the current speed of the vehicle; sampling a current accelerator pedal depth value; sampling a current gear signal of the vehicle; sampling the current road slope value and obtaining the current working mode of the vehicle, state information of an anti-lock braking system and state information of a cruise control system; and determining whether the vehicle is permitted to enter a sliding feedback state according to the current speed of the vehicle, the current accelerator pedal depth value, the current gear signal of the vehicle, the state information of the anti-lock braking system and the state information of the cruise control system by the motor controller. Specifically, after the battery manager obtains the current state of the power battery, the battery manager calculates the maximum charging power of the power battery according to the current state of the power battery, and then the motor controller converts the maximum charging power of the power battery into the maximum feedback torque value of the power battery and sends the maximum feedback torque value of the power battery to a CAN bus. The shift control unit samples the current gear signal of the vehicle and sends the current gear signal of the vehicle to the CAN bus. The electronic speed controller samples the current speed of the vehicle, the state information of the anti-lock braking system and the state information of the cruise control system and sends the current speed of the vehicle, the state information of the anti-lock braking system and the state information of the cruise control system to the CAN bus. The throttle depth sensor samples the current accelerator pedal depth value and sends the current accelerator pedal depth signal to the CAN bus. The electric motor samples the position of a motor rotor, and sends the position of the motor rotor to the motor controller. The motor controller obtains the signals sent by the electronic speed controller, the shift control unit, the throttle depth sensor and the temperature sensor via the CAN bus, and determines whether the vehicle is permitted to enter a sliding feedback state or to exit the sliding feedback state according to the above signals.

In an embodiment of the present disclosure, the vehicle is permitted to enter the sliding feedback state when the following conditions are satisfied: (1) the current speed of the vehicle is larger than or equal to a minimum vehicle speed threshold value; (2) the current accelerator pedal depth value is zero; (3) the anti-lock braking system is in a non-working state; (4) the cruise control system is in the non-working state; and (5) the current gear signal is a D gear signal.

In an embodiment of the present disclosure, the sliding feedback control method of the vehicle further includes: determining whether the vehicle is permitted to exit the sliding feedback state according to the current speed of the vehicle, the current accelerator pedal depth value, the current gear signal of the vehicle, the state information of the anti-lock braking system and the state information of the cruise control system. Specifically, the vehicle is permitted to exit the sliding feedback state when one of the following conditions is satisfied: (1) the current speed of the vehicle is less than the minimum vehicle speed threshold; (2) the current accelerator pedal depth value is larger than zero; (3) the anti-lock braking system is in a working state; (4) the cruise control system is in the working state; and (5) the current gear signal is a non-D gear signal.

In an embodiment of the present disclosure, the current road slope value is sampled by the motor controller. The motor controller further samples the current speed of the vehicle and the current working mode of the vehicle, and thus, by referring to the feedback torque curve stored in the motor controller, the motor controller can calculate the second feedback torque value according to the current speed of the vehicle, the current road slope value and the current working mode of the vehicle. By fully considering the influence of the current speed of the vehicle, the current road slope value and the current working mode of the vehicle on the sliding feedback, the second feedback torque value is more accurate, which enhances the sliding feedback efficiency of the vehicle.

In an embodiment of the present disclosure, the sliding feedback control method of the vehicle further includes: controlling an output torque of an engine according to a target torque signal of the engine sent from the motor controller. When the vehicle is performing the sliding feedback in the HEV mode, the motor controller sends the target torque signal of the engine to an engine control module, and then the engine control module controls the output torque of the engine. Considering the intention of the driver and the economical efficiency, the engine does not provide the output torque while the vehicle is performing the sliding feedback, and thus the target torque signal of the engine equals to zero. When the vehicle is in the EV mode, the engine does not work, and thus the motor controller does not send the target torque signal of the engine to the engine control module.

In an embodiment of the present disclosure, the sliding feedback control method of the vehicle further includes: displaying power state information of the vehicle on a combination instrument. The state information includes whether the sliding feedback of the vehicle is in the EHV mode or in the HV mode.

Figure 5:
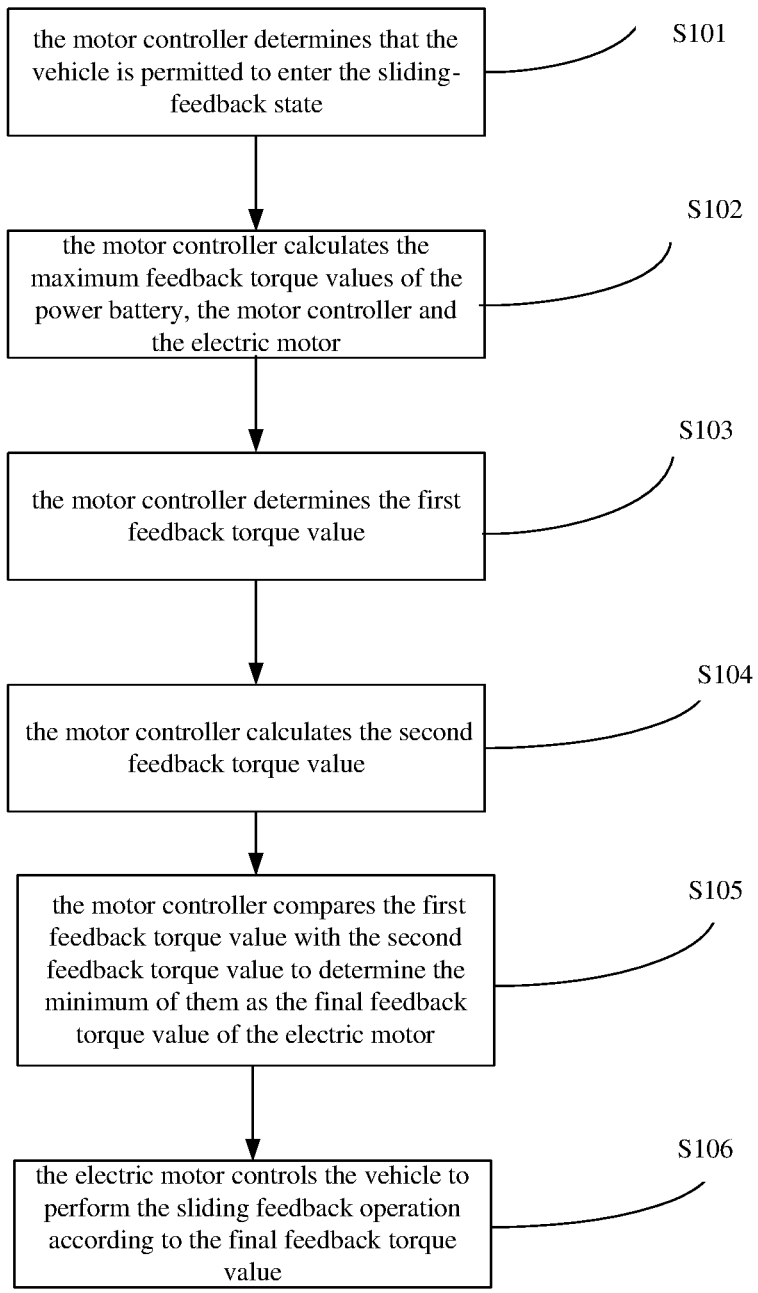
FIG. 5 is a flow chart of a sliding feedback control method of a vehicle according to an embodiment of the present disclosure.

FIG. 5 is a flow chart of a sliding feedback control method of a vehicle according to an embodiment of the present disclosure. As shown in FIG. 5, the method includes following steps.

At step S101, the motor controller determines that the vehicle is permitted to enter the sliding feedback state.

At step S102, the motor controller obtains the maximum feedback torque values of the power battery, the motor controller and the electric motor. Specifically, the battery manager obtains the current state of the power battery and calculates the maximum charging power of the power battery according to the current state of the power battery. The motor controller obtains the current state of the motor controller and calculates the maximum feedback torque value of the motor controller according to the current state of the motor controller. The motor controller converts the maximum charging power of the power battery into the maximum feedback torque value of the power battery. The motor controller obtains the current state of the electric motors and calculates the maximum feedback torque value of the electric motor according to the current state of the electric motor.

At step S103, the motor controller sets the first feedback-torque value. Specifically, the motor controller compares the maximum feedback torque value of the power battery, the maximum feedback torque value of the motor controller and the maximum feedback torque value of the electric motor to obtain a first minimum value, and then determines the first minimum value as the first feedback torque value.

At step S104, the motor controller calculates the second feedback-torque value. Specifically, the motor controller stores the predetermined feedback torque curve, and the motor controller calculates the second feedback torque value according to the current speed of the vehicle, the current road slope value, the current working mode of the vehicle and the predetermined feedback torque curve.

At step S105, the motor controller compares the first feedback torque value with the second feedback torque value to determine the minimum of them as the final feedback torque value of the electric motor.

At step S106, the electric motor controls the vehicle to perform the sliding feedback operation according to the final feedback torque value of the electric motor.

Figure 6:
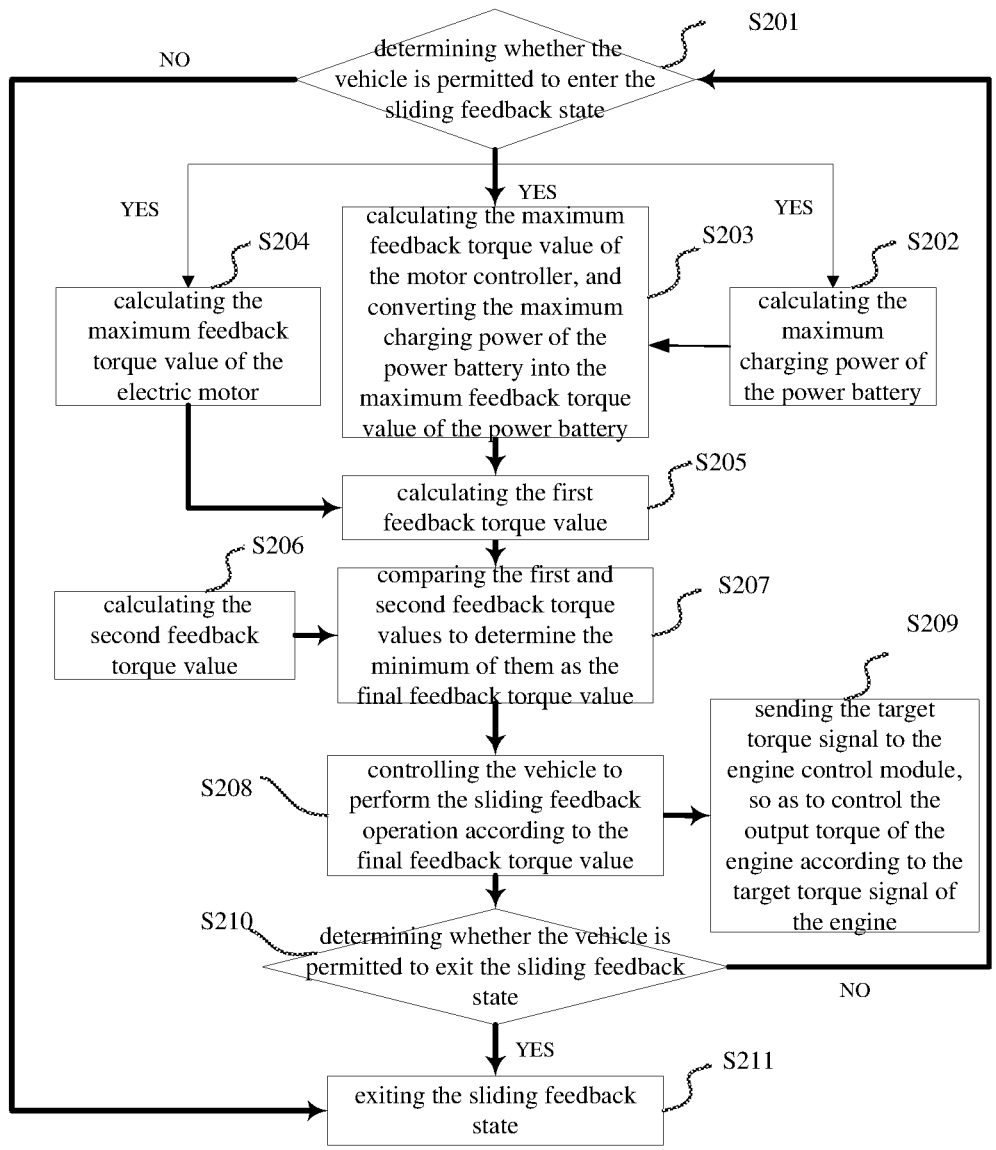
FIG. 6 is a flow chart of a sliding feedback control method of a vehicle according to another embodiment of the present disclosure.

In another embodiment of the present disclosure, as shown in FIG. 6, the sliding feedback control method of the vehicle includes following steps.

At step S201, the motor controller determines whether the vehicle is permitted to enter the sliding feedback state, if yes, execute step S202, step S203 and step S204 at the same time; and if no, execute step S211.

At step S202, the battery manager calculates the maximum charging power of the power battery. Specifically, the battery manager obtains the current state of the power battery and calculates the maximum charging power of the power battery according to the current state of the power battery, in which the current state of the power battery includes the electric quantity and the temperature of the power battery, and then execute step S203.

At step S203, the motor controller calculates the maximum feedback torque value of the motor controller and converts the maximum charging power of the power battery into the maximum feedback torque value of the power battery. Specifically, the motor controller obtains the current state of the motor controller, and calculates the maximum feedback torque value of the motor controller according to the current state of the motor controller, in which the current state of the motor controller includes the temperature of the motor controller, and then execute step S205.

At step S204, the motor controller calculates the maximum feedback torque value of the electric motor. Specifically, the motor controller obtains the current state of the electric motor, and the motor controller calculates the maximum feedback torque value of the electric motor according to the current state of electric motor, in which the current state of the electric motor includes the temperature of the electric motor and the position of the motor rotor, and then execute step S205.

At step S205, the motor controller calculates the first feedback torque value. Specifically, the motor controller compares the maximum feedback torque value of the power battery, the maximum feedback torque value of the motor controller and the maximum feedback torque value of the electric motor to obtain the first minimum value, and then determines the first minimum value as the first feedback torque value, then execute step S207.

At step S206, the motor controller calculates the second feedback torque value. Specifically, the motor controller stores the predetermined feedback torque curve, and the motor controller calculates the second feedback torque value according to the current speed of the vehicle, the current road slope value, the current working mode of the vehicle and the predetermined feedback torque curve, and then execute step S207.

At step S207, the motor controller compares the first feedback torque value with the second feedback torque value to obtain the second minimum value, and then determines the second minimum value as the final feedback torque value of the electric motor, i.e. the motor controller compares the first feedback torque value with the second feedback torque value to determine the minimum of them as the final feedback torque value of the electric motor and then execute step S208.

At step S208, the electric motor controls the vehicle to perform the sliding feedback operation according to the final feedback torque value, and then execute step S210. If the vehicle is performing the sliding feedback operation in the HEV mode, then execute step S209.

At step S209, the motor controller sends the target torque signal to the engine control module, and then the engine control module controls the output torque of the engine according to the target torque signal of the engine. Specifically, the output torque of the engine is used to provide the resistance to the vehicle, and thus, when the target torque signal of the engine is equal to zero, the engine control module controls the output torque of the engine to be zero. In one embodiment of the present disclosure, the engine is separated from the transmission device via a separator, thus controlling the engine to output a zero torque.

At step S210, the motor controller determines whether the vehicle is permitted to exit the sliding feedback state. Specifically, the motor controller receives the signals for determining whether the vehicle is permitted to exit the sliding feedback state. If the signals indicate that the vehicle is permitted to exit the sliding feedback state, execute step S211, and if no, the vehicle does not exit the sliding feedback state, e.g. return to step S201 to realize the circulation process.

At step S211, the vehicle exits the sliding feedback state.

Figure 7:
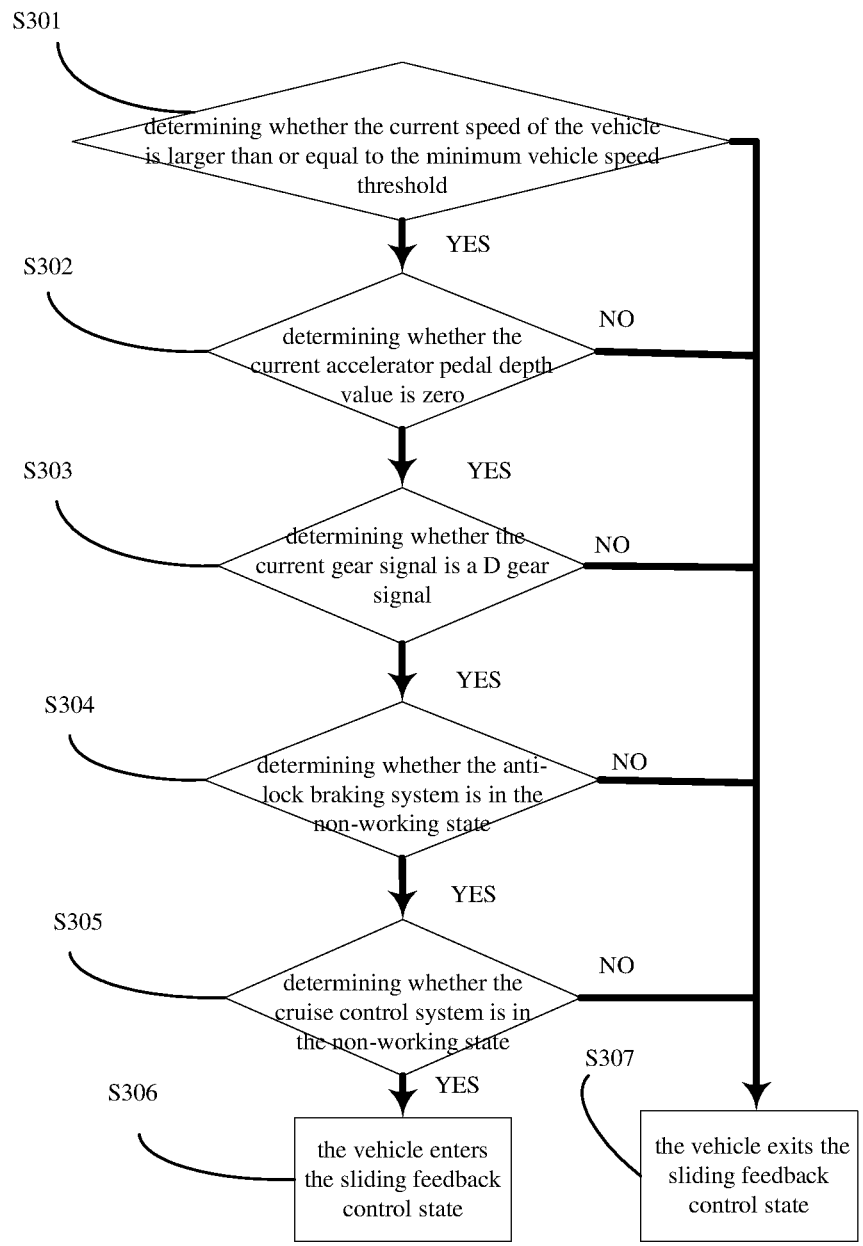
FIG. 7 is a flow chart of a method of controlling a vehicle to enter a sliding feedback control state according to an embodiment of the present disclosure.

In one embodiment of the present disclosure, as shown in FIG. 7, the method for controlling the vehicle to enter the sliding feedback control state includes following steps.

At step S301, the electronic speed controller samples the current speed of the vehicle and determines whether the current speed of the vehicle is larger than and equal to the minimum vehicle speed threshold, if yes, execute step S302; and if no, execute step S307.

At step S302, the throttle depth sensor samples the current accelerator pedal depth value, and determines whether the current accelerator pedal depth value is zero, if yes, execute step S303; and if no, execute step S307.

At step S303, the shift control unit samples the current gear signal, and determines whether the current gear signal is the D gear signal, if yes, execute step 304; and if no, execute step S307.

At step S304, the motor controller determines whether the anti-lock braking system is in the non-working state, if yes, execute step 305; and if no, execute step S307.

At step S305, the motor controller determines whether the cruise control system is in the non-working state, if yes, execute step S306; and if no, execute step S307.

At step S306, the vehicle enters the sliding feedback control state.

At step S307, the vehicle exits the sliding feedback control state.

Figure 8:
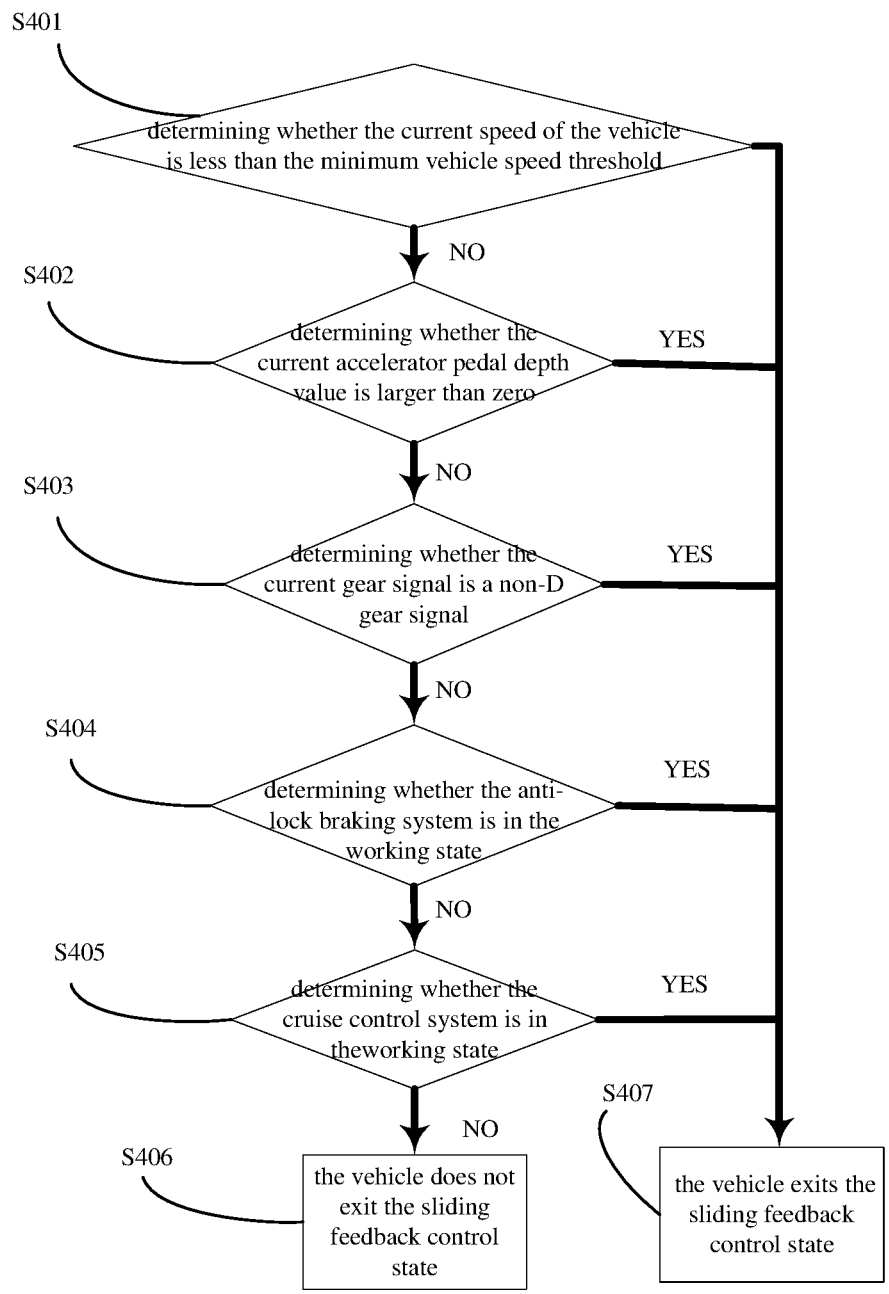
FIG. 8 is a flow chart of a method of controlling a vehicle to exit a sliding feedback control state according to an embodiment of the present disclosure.

In one embodiment of the present disclosure as shown in FIG. 8, the method for controlling the vehicle to exit the sliding feedback control state includes following steps.

At step S401, the electronic speed controller samples the current speed of the vehicle and determines whether the current speed of the vehicle is less than the minimum vehicle speed threshold, if no, execute step S402; and if yes, execute step S407.

At step S402, the throttle depth sensor samples the current accelerator pedal depth value, and determines whether the current accelerator pedal depth value is larger than zero, if no, execute step S403; and if yes, execute step S407.

At step S403, the shift control unit samples the current gear signal, and determines whether the current gear signal is the non-D gear signal, if no, execute step 404; and if yes, execute step S407.

At step S404, the motor controller determines whether the anti-lock braking system is in the working state, if no, execute step 405; and if yes, execute step S407.

At step S405, the motor controller determines whether the cruise control system is in the working state, if no, execute step S406; and if yes, execute step S407.

At step S406, the vehicle does not exit the sliding feedback control state.

At step S407, the vehicle exits the sliding feedback control state.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A sliding feedback control system of a vehicle, comprising:
   an electric motor;
   a power battery configured to supply power to the electric motor;
   a battery manager, connected with the power battery, and configured
     to obtain a current state of the power battery, and
     to obtain a maximum charging power of the power battery according to the current state of the power battery; and
   a motor controller, connected with the electric motor, and configured
     to obtain current states of the motor controller and the electric motor,
     to obtain maximum feedback torque values of the motor controller and the electric motor respectively according to the current states of the motor controller and the electric motor,
     to convert the max charging power of the power battery into a maximum feedback torque value of the power battery,
     to determine a first feedback torque value, wherein the first feedback torque value is a first minimum value of (i) the maximum feedback torque value of the power battery, (ii) the maximum feedback torque value of the motor controller, and (iii) the maximum feedback torque value of the electric motor,
     to obtain a second feedback torque value according to a current speed of the vehicle, a current road slope value, a current working mode of the vehicle, and a predetermined sliding feedback torque curve, and
     to determine a final feedback torque value of the electric motor, wherein the final feedback torque value of the electric motor is a second minimum value of (i) the first feedback torque value and (ii) the second feedback torque value, such that the electric motor is configured to control the vehicle to perform a sliding feedback operation according to the final feedback torque value of the electric motor.

2. The system of claim 1, further comprising:
   an electronic speed controller, connected with the motor controller, and configured to sample the current speed of the vehicle;
   a throttle depth sensor, connected with the motor controller, and configured to sample a current accelerator pedal depth value;
   a shift control unit, connected with the motor controller, and configured to sample a current gear signal of the vehicle; and
   a temperature sensor, connected with the power battery, the electric motor, and the motor controller respectively, and configured to sample temperature values of the power battery, the electric motor and the motor controller.

3. The system of claim 2, wherein the current state of the power battery comprises an electric quantity and a temperature of the power battery.

4. The system of claim 2, wherein the current state of the motor controller comprises a temperature of the motor controller.

5. The system of claim 2, wherein the current state of the electric motor comprises a temperature of the electric motor and a position of a motor rotor.

6. The system of claim 2, wherein the motor controller is further configured to:
   sample the current road slope value and obtain the current working mode of the vehicle, state information of an anti-lock braking system and state information of a cruise control system; and
   determine whether the vehicle is permitted to enter a sliding feedback state according to the current speed of the vehicle, the current accelerator pedal depth value, the current gear signal of the vehicle, the state information of the anti-lock braking system and the state information of the cruise control system.

7. The system of claim 6, wherein the vehicle is permitted to enter the sliding feedback state when following conditions are satisfied:
   the current speed of the vehicle sampled by the electronic speed controller is larger than or equal to a minimum vehicle speed threshold;
   the current accelerator pedal depth value sampled by the throttle depth sensor is zero;
   the anti-lock braking system is in a non-working state;
   the cruise control system is in the non-working state; and
   the current gear signal sampled by the shift control unit is a D gear signal.

8. The system of claim 6, wherein the motor controller is configured to determine whether the vehicle is permitted to exit the sliding feedback state according to the current speed of the vehicle, the current accelerator pedal depth value, the current gear signal of the vehicle, the state information of the anti-lock braking system and the state information of the cruise control system.

9. The system of claim 8, wherein the vehicle is permitted to exit the sliding feedback state when one of following conditions is satisfied:
the current speed of the vehicle sampled by the electronic speed controller is less than the minimum vehicle speed threshold;
the current accelerator pedal depth value sampled by the throttle depth sensor is larger than zero;
the anti-lock braking system is in a working state;
the cruise control system is in the working state; and
the current gear signal sampled by the shift control unit is a non-D gear signal.

10. The system of claim 1, further comprising:
an engine control module configured to control an output torque of an engine according to a target torque signal of the engine sent by the motor controller.

11. The system of claim 1, further comprising:
a combination instrument configured to display power state information of the vehicle.

12. A vehicle, comprising a sliding feedback control system of claim 1.

13. A sliding feedback control method of a vehicle, comprising:
obtaining a current state of a power battery and obtaining a maximum charging power of the power battery according to the current state of the power battery;
obtaining current states of a motor controller and an electric motor, and obtaining maximum feedback torque values of the motor controller and the electric motor respectively according to the current states of the motor controller and the electric motor;
converting the maximum charging power of the power battery into a maximum feedback torque value of the power battery;
obtaining a first minimum value of (i) the maximum feedback torque value of the power battery, (ii) the maximum feedback torque value of the motor controller, and (iii) the maximum feedback torque value of the electric motor, and setting a first feedback torque value as the first minimum value;
obtaining a second feedback torque value according to a current speed of the vehicle, a current road slope value, a current working mode of the vehicle and a predetermined sliding feedback torque curve;
obtaining a second minimum value of (i) the first feedback torque value and (ii) the second feedback torque value, and setting a final feedback torque value of the electric motor as the second minimum value; and
controlling the vehicle to perform a sliding feedback operation according to the final feedback torque value of the electric motor.

14. The method of claim 13, further comprising:
sampling the current speed of the vehicle;
sampling a current accelerator pedal depth value;
sampling a current gear signal of the vehicle;
sampling the current road slope value and obtaining the current working mode of the vehicle, state information of an anti-lock braking system and state information of a cruise control system; and
determining whether the vehicle is permitted to enter a sliding feedback state according to the current speed of the vehicle, the current accelerator pedal depth value, the current gear signal of the vehicle, the state information of the anti-lock braking system and the state information of the cruise control system.

15. The method of claim 14, wherein the vehicle is permitted to enter the sliding feedback state when following conditions are satisfied:
the current speed of the vehicle is larger than or equal to a minimum vehicle speed threshold;
the current accelerator pedal depth value is zero;
the anti-lock braking system is in a non-working state;
the cruise control system is in the non-working state; and
the current gear signal is a D gear signal.

16. The method of claim 14, further comprising:
determining whether the vehicle is permitted to exit the sliding feedback state according to the current speed of the vehicle, the current accelerator pedal depth value, the current gear signal of the vehicle, the state information of the anti-lock braking system and the state information of the cruise control system.

17. The method of claim 16, wherein the vehicle is permitted to exit the sliding feedback state when one of following conditions is satisfied:
the current speed of the vehicle is less than the minimum vehicle speed threshold;
the current accelerator pedal depth value is larger than zero;
the anti-lock braking system is in a working state;
the cruise control system is in the working state; and
the current gear signal is a non-D gear signal.

18. The method of claim 13, further comprising:
sampling temperature values of the power battery, the electric motor and the motor controller.

19. The method of claim 13, further comprising:
sampling the current road slope value by the motor controller.

20. The method of claim 13, further comprising:
controlling an output torque of an engine according to a target torque signal of the engine sent by the motor controller.

* * * * *